Sept. 22, 1970　　　　　　　K. JENSEN　　　　　　3,530,500
CONTACT FORMING BETWEEN END PORTIONS OF THE ARMATURE WINDING
AND THE COMMUTATOR OF A DYNAMOELECTRIC MACHINE
Filed July 1, 1968

INVENTOR
KNUT JENSEN

BY  *Nolte & Nolte*

ATTORNEYS

United States Patent Office 3,530,500
Patented Sept. 22, 1970

3,530,500
CONTACT FORMING BETWEEN END PORTIONS OF THE ARMATURE WINDING AND THE COMMUTATOR OF A DYNAMOELECTRIC MACHINE
Knut Jensen, Karl-Marx-Stadt, Germany, assignor to Zentrallaboratorium Elektrogerate der Vereinigung Volkseigener Betriebe Elektrogerate, Karl-Marx-Stadt, Germany
Filed July 1, 1968, Ser. No. 741,486
Int. Cl. H01r *39/32*
U.S. Cl. 310—234    8 Claims

ABSTRACT OF THE DISCLOSURE

In a dynamoelectric machine, the end turns of the armature windings are connected to the commutator by connecting elements which, in order to lessen the effect of contrifugal forces on them, are tight-fitted in a recess formed in respective segments in the face of the commutator body and extend axially away from the latter. The commutator has a moulded center portion with an axial opening therein, such center portion partly surrounding the tight-fitted connecting elements to further secure them in position. In another embodiment the connecting elements are turned radially from their initial axial position and extend through radial slots in the commutator. To improve the connection between the commutator segments and the connecting elements, a conducting emulsion can be placed in the recess.

BACKGROUND OF THE INVENTION

Field of the invention

The invention relates to a contact formed between the commutator and the armature winding end portions of a dynamoelectric machine in which the commutator is made preferably from carbon.

Prior art

It is known to provide contact between carbon and metal by compacting a metallic conductor into the bore of a carbon lamella using a metallic or carbon powder. There are also contacts known in which the joining of the carbon with the metal is effected by riveting, pressing, threading, or ring joining methods.

Such contacts become, however, defective in operation due to the forces developed during rotation of the armature, such forces being particularly the centrifugal end vibrational forces, which are further enhanced by accompanying machanical stresses and loads. Such contact types are also complicated in their design, and their use with small size carbon commutators is nearly entirely prohibited.

It is also known to produce contact connections by soldering to a metal layer deposited on the carbon through evaporation or in a chemical process. Such contact types do not behave satisfactorily under highly mechanical loadings since the layers produced by cathode spattering are loose and highly rich in oxides. Furthermore, the manufacturing of the last mentioned contact types requires elaborate apparatus.

There are also known contacts which use additives consisting of metallic particles added to glue or resin in order to make the latter electrically conductive. The conducting additives perform the current translation while the settable resin provides the mechanical strength for the assembly.

These methods using mixtures consisting of glues or resins with conductive additives therein did not prove themselves to be satisfactory for making commutator contacts since they are the result of a compromise between electrical conductivity and mechanical strength. In the last mentioned type of contacts due to the comprise, usually only one of the components satisfies the requirements according to its predominance in the mixture.

BRIEF SUMMARY OF THE INVENTION

It is, therefore, an object of the invention to provide a contact between the commutator and the end turns of the armature in a dynamoelectric machine which overcomes the above described disadvantages of known contacts or connections.

It is a further object of the invention to provide a reliable, stable, electrical and mechanical connection between a carbon commutator and a plurality of contacting elements connecting the commutator to the armature end winding portions.

In accordance with the invention the contacting or connecting elements, which for example might consist of copper wires with tin coating thereon, are placed in an end face of the commutator body by being tight fitted into a circumferential recess or radial slots in the face portion of the commutator. The electrical connection between the connecting or contacting elements or the commutator blank is preferably improved by the introduction of a conducting silver emulsion into the recess.

The commutator in accordance with the invention improves the degree of available automation since the commutator body can be made as a whole unit, then the contacting elements can be placed into the provided recesses whereupon the obtained assembly can undergo further assembly process on modern armature winding machines, since the contact elements in accordance with the invention perform the same function as the known hooks of copper commutators.

BRIEF DESCRIPTION OF THE DRAWINGS

The invention will became more readily apparent from the following description of preferred embodiments thereof illustrated in the accompanying drawings in which:

With reference to FIG. 1, it is seen that the contacting or connecting elements 1 are placed axially in respective recesses 2 provided in circumferential segments 8 of an unfinished commutator body 3'. The size of the recess is dimensioned to provide a tight fit for each of the connecting elements. In order to improve the electrical connection between the segments 8 and the connecting elements 1, a conducting fluid such as a conducting silver emulsion 4 is introduced into the recess prior to inserting the contacting elements into their position. It is seen in FIG. 1 that the recess has an inwardly tapering bottom portion for receiving the conducting fluid. After the conducting fluid 4 has been dried, an inner portion 5 is molded into the unfinished commutator body 3', the inner portion is made preferably from a molded resin or from a compactable material. During the compacting or molding process an axial bore 6 is left available for mounting the entire commutator assembly on the armature. It is seen in FIGS. 1 and 2 that the contacting elements 1 are partly surrounded by the molded or compacted inner portion since the ends of the recesses 2 are enlarged on the side thereof facing the axial bore 6 to extend to the inner mold portion 5, thereby permitting flow of the mold or of the compacted material of the inner portion 5 against the circular row of the connecting elements 1. After the molding operation has been performed and after the resin or compacted material has been set or tempered, respectively, the inner portion 5 is slotted as shown at 10 in FIG. 2 to prepare the individual commutator segments 8 in operative condition.

Figure 1:
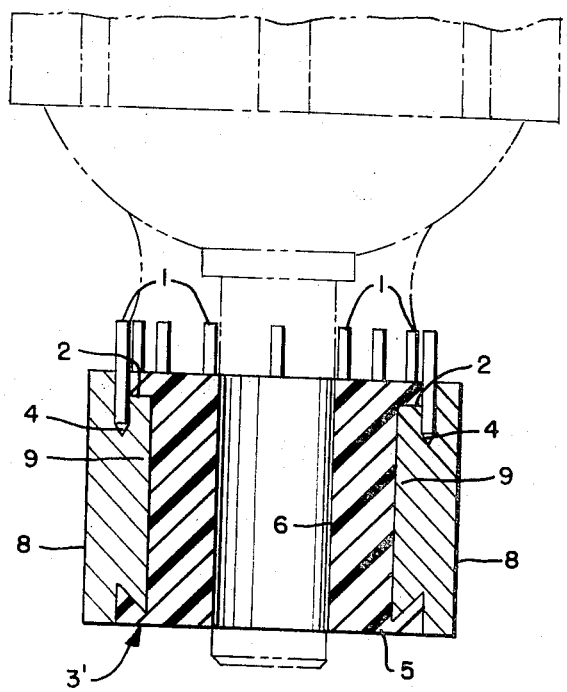
FIG. 1 illustrates a commutator in accordance with one embodiment of the invention having axially positioned connecting elements, the commutator being in section along line 1—1 of FIG. 2.
Figure 2:
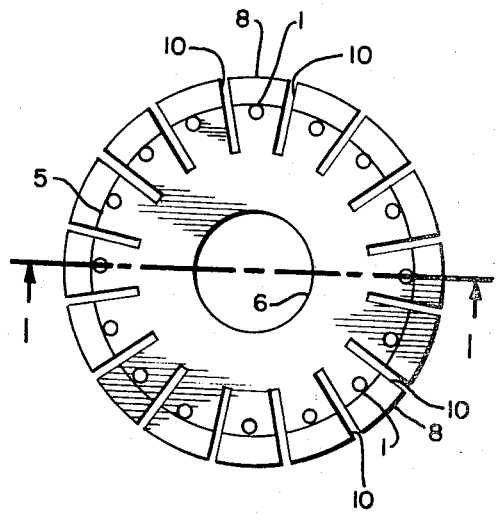
FIG. 2 is a plan view of the commutator of FIG. 1.
Figure 3:
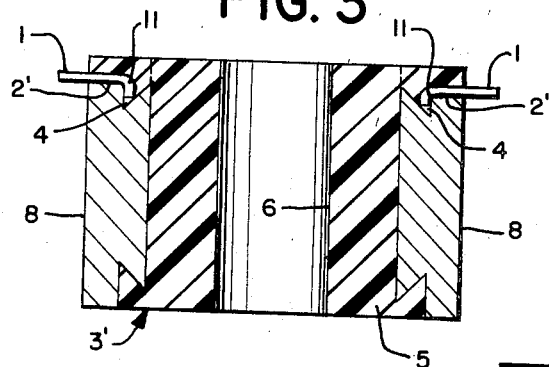
FIG. 3 is a commutator illustrating another embodiment of the invention with radially positioned connecting elements, the commutator being in section along line 3—3 of FIG. 4.
Figure 4:
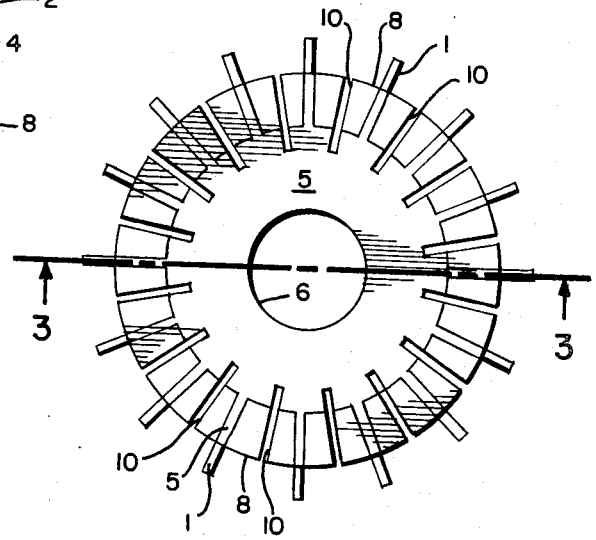
FIG. 4 is the plan view of the commutator of FIG. 3.
Figure 5:
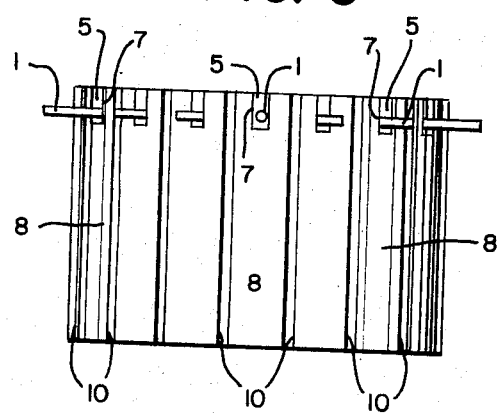
FIG. 5 is an elevational view of the commutator of FIG. 3.

Referring now to another embodiment shown in FIGS. 3–5 it is seen that a radial slot 7 is provided in each segment 8 into which the connecting elements are placed.

The recess 2' is also present in the embodiment of FIGS. 3–5 into which a hooked portion 11 of the connecting element 1 extends. The connecting elements in the second embodiment of the invention are, after a short axial distance, turned substantially at a 90° angle into the radial direction and pass through the radial slot 7 out of the commutator.

The inner mold portion 5 surrounds at least partly again the connecting elements 1 as seen in more detail in FIG. 3. The electrical connection between the commutator segments 8 and the connecting elements are improved again by the introduction of a conducting emulsion 4 into the bottom of the recess 2'. After the assembly the commutator body is slotted into individual commutator elements 8 each having a contact element 1 associated therewith.

It has been shown that mechanical stability of the contacting elements with the commutator is attained by the axial positioning of the contacting elements 1 in the commuator body 3'. During operation, the contacting elements 1 do not undergo an undesired pulling tension due to the centrifugal forces, instead they press themselves with increasing force against the commutator body 3, which then further improves the transit resistance between these two elements. Therefore, the connection as described above is particularly advantageous in electrical machines operating at high speeds. A reliable mechanical support of the contacting elements 1 is attained due to the fact that the commutator body is nearly entirely molded with the exception of a mounting bore passing therethrough so that after the setting or tempering of the molded or compacted material, the latter further supports the contacting elements.

A further strengthening of the contacting elements 1 in their position has been also demonstrated when the commutator body 3 is formed with the ends of the recesses 2 being enlarged at the side thereof facing the axial bore 6 whereupon a flow of the mold is permitted against the contacting elements.

The invention also provides that the connecting elements may be formed by appropriate shaping such as bending at an angle, twisting or upsetting whereupon an improved tight fit results.

It has been also demonstrated that the invention provides an improved electrical connection between the contact elements and the commutator body by introducing a conducting liquid enriched with metallic particles, such as a conducting silver emulsion, into the recess before placing the connecting elements into position thereinto. By the provision of a tapered bottom portion of the recess, the introduced liquid will distribute itself over the entire slot width.

The manufacture of the commutator is done by the following sequence of operations:

(1) Preparing a carbon ring by single pressing or by separating of an extruded carbon tube
(2) Making the front-side recesses
(3) Pressing-in the contacting elements and contacting with an electrically conducting emulsion
(4) Molding or compacting the carbon ring with molded resin or compactable material
(5) Cutting the carbon ring into segments up to the inner part of molded resin or compactable material
(6) Eventually post-compacting or molding the separating slots.

What is claimed is:
1. In a dynamoelectric machine of the type having an armature and commutator means, windings on said armature, said armature windings having end portions, and means for connecting said winding end portions to said commutator means; the improvement wherein said commutator means comprises an outer body portion formed of compacted conductive material and an inner molded portion of a moldable material secured to said outer portion and having an axial opening therein for mounting said commutator means, said body portion having a recessed portion on one end face thereof, and wherein said means for connecting said winding end portions to said commutator means comprises a plurality of conductive connecting elements extending into said recessed portion, and wherein the moldable material of said inner portion surrounds portions of said connecting elements for securing said elements in position in said commutator means.

2. The dynamoelectric machine of claim 1 wherein said recessed portion of said body portion has a circumferential recess formed therein for receiving said connecting elements.

3. The dynamoelectric machine of claim 1 wherein said recessed portion of said body portion comprises a plurality of axially extending recesses which are enlarged on the side thereof facing said axial opening to extend to said inner portion.

4. The dynamoelectric machine of claim 3 wherein said recesses have inwardly tapered bottom portions.

5. The dynamoelectric machine of claim 1 wherein said commutator body portion has radially extending slots in said one face for receiving said connecting elements therein.

6. The dynamoelectric machine of claim 5 wherein said connecting elements extend radially through said radial slots and have hooked portions within said inner portion in contact with said recessed portion of said body portion.

7. The dynamoelectric machine of claim 1 wherein said connecting elements extend axially from said one face of said commutator means.

8. The dynamoelectric machine of claim 1 further comprising a conductive material in said recessed portion for improving the electrical connection between said elements and said body portion.

References Cited
UNITED STATES PATENTS

| | | | |
|---|---|---|---|
| 2,476,795 | 7/1949 | Avigdor | 310—233 |
| 2,572,956 | 10/1951 | Servis | 310—234 |
| 2,602,988 | 7/1952 | Klym | 310—235 |
| 2,782,330 | 2/1957 | Baclawski | 310—234 |
| 2,845,556 | 7/1958 | Gunkler et al. | 310—234 |
| 2,878,405 | 3/1959 | Merril | 310—234 |
| 2,946,908 | 7/1960 | Ulbrich | 310—234 |
| 3,421,212 | 1/1969 | Chabot | 310—234 |

MILTON O. HIRSHFIELD, Primary Examiner

L. L. SMITH, Assistant Examiner

U.S. Cl. X.R.

310—235